United States Patent [19]

Casse et al.

[11] Patent Number: 4,944,374
[45] Date of Patent: Jul. 31, 1990

[54] LOCK UP CLUTCH FOR A HYDRO-KINETIC COUPLING APPARATUS, ESPECIALLY FOR AN AUTOMOTIVE VEHICLE

[75] Inventors: Pierre Casse, Ermont; Jean Bionaz, Fontenay-Sous-Bois, both of France

[73] Assignee: Valeo, Paris, France

[21] Appl. No.: 298,172

[22] Filed: Jan. 18, 1989

[30] Foreign Application Priority Data

Jan. 18, 1988 [FR] France .................. 88.00488

[51] Int. Cl.⁵ .................. F16H 45/02; F16D 3/06
[52] U.S. Cl. .................. 192/3.29; 192/3.28; 192/106.1
[58] Field of Search .................. 192/3.28, 3.29, 3.3, 192/3.31, 70.16, 70.17, 70.18, 106.1

[56] References Cited

U.S. PATENT DOCUMENTS

| | | |
|---|---|---|
| 2,841,262 | 7/1958 | Zeidler . |
| 3,450,241 | 6/1969 | Kuno .................. 192/70.18 |
| 3,695,404 | 10/1972 | Maucher et al. .................. 192/70.18 |
| 4,353,444 | 10/1982 | Bionaz .................. 192/3.29 |
| 4,427,098 | 1/1984 | Kubo et al. .................. 192/3.28 |
| 4,437,551 | 3/1984 | Gimmler et al. .................. 192/3.28 |

FOREIGN PATENT DOCUMENTS

| | | |
|---|---|---|
| 57-51056 | 3/1982 | Japan . |
| 2045367 | 10/1980 | United Kingdom . |
| 2118643 | 11/1983 | United Kingdom .................. 192/3.3 |
| 2189297 | 10/1987 | United Kingdom .................. 192/70.18 |

Primary Examiner—Rodney H. Bonck
Attorney, Agent, or Firm—Charles E. Brown; Charles A. Brown

[57] ABSTRACT

The invention relates to a clutch of the kind comprising a coupling element (33) which acts like a piston, and a clutch plate coupled with the coupling element to permit the latter to be driven in rotation. In order to drive the coupling element (33) positively in rotation in both directions, the clutch plate (35) has in combination two groups of tongue or strip portions (48T, 48R), which extend in opposite circumferential directions and which are associated in the sense that each strip portion of one group is paired with a strip portion of the other group, a strip portion (48T) of the first group being continuous with a strip portion (48R) of the second group.

7 Claims, 3 Drawing Sheets

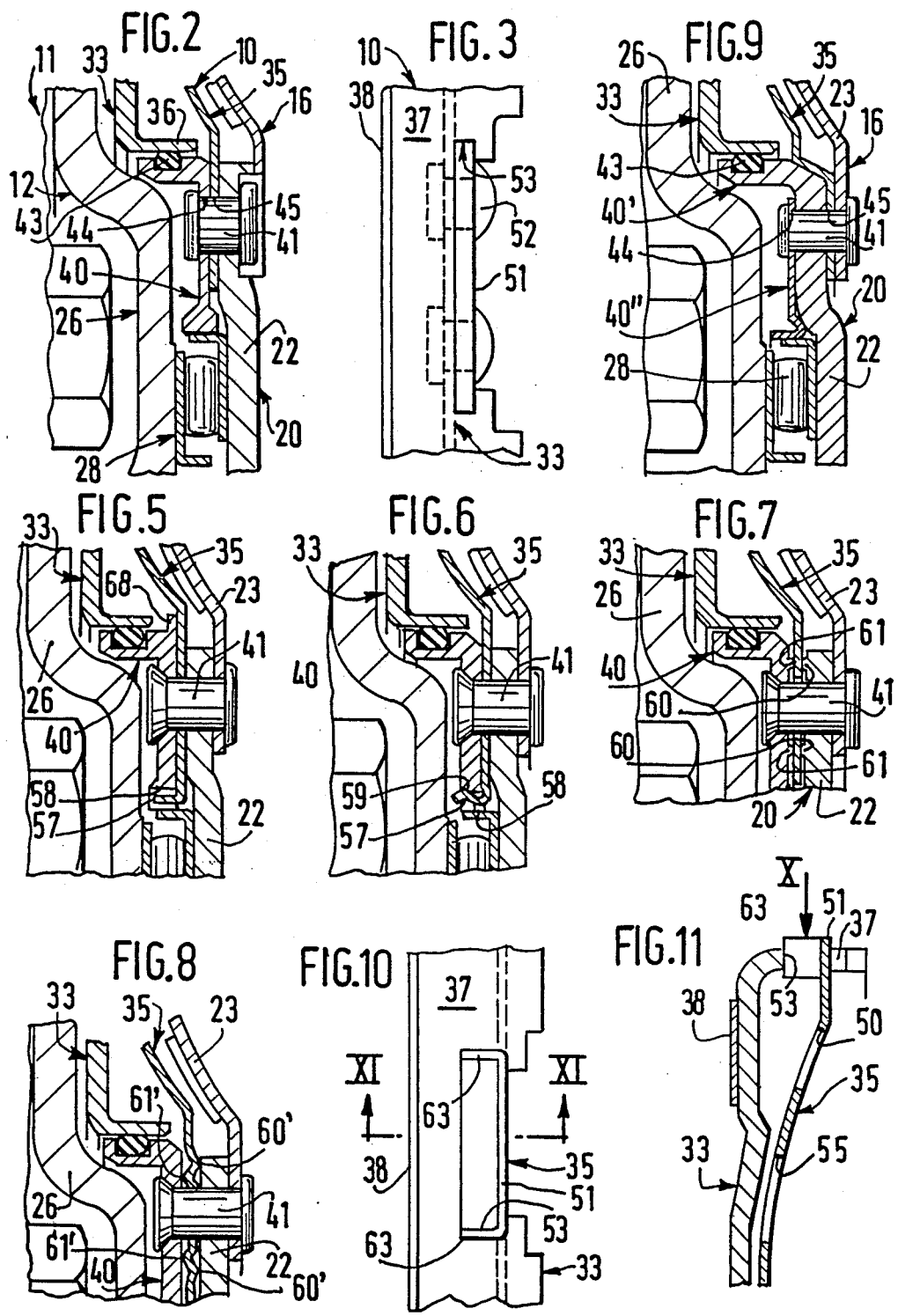

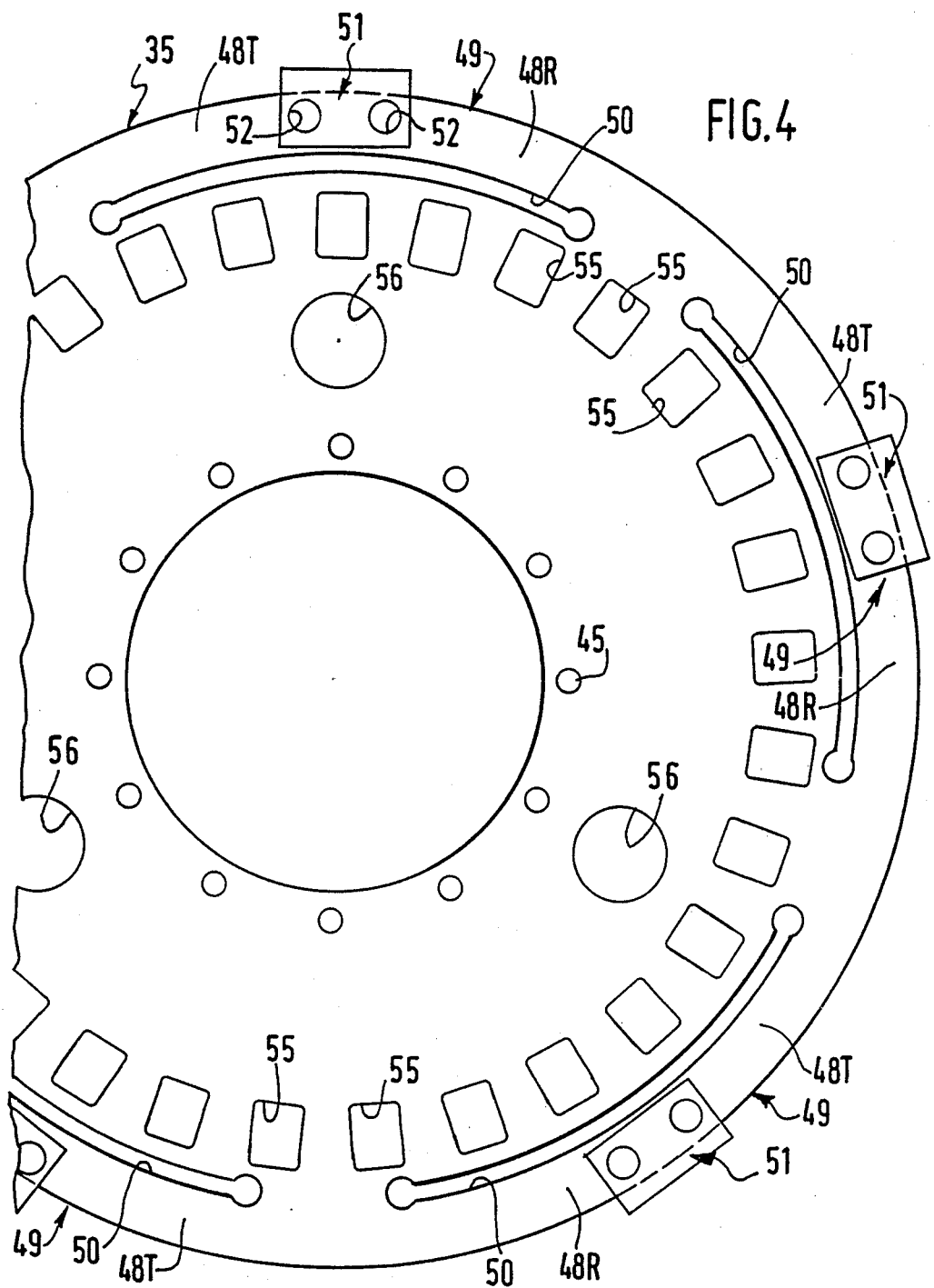

LOCK UP CLUTCH FOR A HYDRO-KINETIC COUPLING APPARATUS, ESPECIALLY FOR AN AUTOMOTIVE VEHICLE

FIELD OF THE INVENTION

The present invention is concerned generally with hydro-kinetic coupling apparatus of the kind which is commonly used for example in certain types of automotive vehicles to provide automatic or semi automatic transmission. The invention is directed more particularly towards those apparatuses of this hydro-kinetic coupling type in which a lock up clutch is provided between the turbine wheel and the opposed casing wall, the lock up clutch being arranged to provide direct driving of the turbine wheel by the casing in certain modes to operation of the transmission.

BACKGROUND OF THE INVENTION

In general terms, such a lock up clutch includes a coupling element which acts like a piston, together with a drive device. The coupling element is adapted to lie closely against the casing wall opposite to the turbine wheel under the action of the hydraulic pressure, which is appropriately controlled for this purpose, so that the coupling element becomes itself coupled by friction with the casing wall for rotation therewith. The drive device is coupled with the coupling element for rotation therewith so as to allow the latter to be rotatably driven. The drive device is arranged to be coupled for rotation with any drive member whatsoever, connected for rotation with the turbine Wheel. Such a driving member is most commonly the turbine wheel hub.

The present invention is directed more particularly to the case in which, when torsional oscillations are absorbed by a continuous adaptation of the coupling pressure which enables the peaks of the torque characteristic to be damped, the drive device comprises a simple plate or wheel which is circumferentially rigid, as is described in U.S. Pat. No. 4,353,444 issued on Oct. 12 1982.

This plate, or clutch plate, has tongues or strip portions which are resiliently deformable in the axial direction and which lock the clutch plate to the associated coupling element. In practice it is important that, while the design of the clutch plate must be such as to ensure that the coupling element is driven in rotation in a circumferentially rigid manner, the coupling element must at the same time be allowed axially as much freedom of movement as is necessary for it to be brought into close engagement with the casing wall opposite to the turbine wheel and disengaged therefrom.

It is also important that, in spite of its attachment to the clutch plate, the coupling element must be able to react virtually instantaneously to forces applied by the hydraulic pressure to which it is submitted, without risk of jamming on the hub. The coupling element is slidingly carried, sealingly, on the hub in order to perform its function as a piston.

A final important consideration is that, at least in certain applications, the plate must be so designed as to be able to drive the coupling element rigidly, not only when the assembly is operating in the so-called "driving" mode in which the engine tends to drive the vehicle, but also when it is operating in the so-called "reverse" or "regenerative" mode in which it is the vehicle itself which is tending to drive the engine.

In the United States Patent mentioned above, the tongues or strips employed between the clutch plate and the coupling element extend circumferentially in only one direction, which is the direction corresponding to operation of the assembly in the driving mode; and in order to reduce automatically the consequences of any buckling during operation in the reverse mode, means are provided in association with the clutch plate and coupling element, such that circumferential abutting engagement is with a clearance which tends to limit buckling.

SUMMARY OF THE INVENTION

An object of the present invention is to provide a novel lock up type clutch having a simple clutch plate which, while responding in a particularly simple and reliable manner to different conditions to which it may be subjected, does not require means for circumferential engagement having any clearance for limiting buckling of the tongues or strips.

According to the invention, there is provided a lock up clutch for a hydro-kinetic coupling device, particularly for an automotive vehicle, the clutch being of the kind comprising a coupling element adapted to act as a piston, and a clutch or hub plate coupled with the coupling element for rotation therewith so as to permit the clutch plate and coupling element to be driven together in rotation, the clutch plate having strip portions integral therewith and axially deformable for rigid engagement of the clutch plate with the coupling element, the clutch plate being itself adapted to be coupled to a drive member for rotation therewith, the clutch being characterized in that the clutch plate has, in combination two groups of the strip portions, namely a first group in which the strip portions extend circumferentially in one direction and a second group in which they extend circumferentially in the opposite direction, whereby the coupling element can be driven positively in rotation. thereof is associated as a pair with a strip portion of the other group a strip portion of a first group being continuous with a strip portion of the second group in the manner of a loop, the assembly being separated from the running part of the clutch plate by a slot elongated circumferentially.

Apart from the fact that the elongated slots just mentioned provide a certain amount of axial flexibility in the clutch plate, these slots have advantage that they can be used as passages for the oil which is to be applied under pressure to the associated coupling element.

For the same purpose the clutch plate preferably has oil ports arranged radially inwardly of these slots, for passage of the oil through them during operation. These ports impart further flexibility to the clutch plate.

When the blades of the turbine wheel of the hydro-kinetic coupling apparatus are mounted in the body which carries them, by means of pads as mentioned above then according to a preferred feature of the invention the oil ports of the clutch plate are positioned in register with these pads.

By providing the same number of oil ports as there are of the pads, the latter then allow the axial bulk of the assembly to be minimized to advantage, since the pads corresponding to the blades of the turbine wheel can at least partially engage in the oil ports.

In spite of the provision of the oil ports and a comparatively low thickness generally, the clutch plate in a lock up clutch according to the invention has all the rigidity required in the circumferential direction. It may with advantage be provided with stiffening means, formed during the manufacture of the clutch plate by bending or other deformation of the plate material. In particular, the clutch plate may be attached to an axial flange provided for this purpose on the coupling element, with the demi-meridian of the clutch plate being preferably generally curved in a bowl shape, with its concave side directed away from the coupling element.

This configuration allows the clutch plate to follow more closely the contours of the turbine wheel, and this again tends to lead to reduced axial length of the assembly.

In addition, if desired, this can effectively be used to enable the clutch plate to urge the associated coupling element at all times towards the casing wall opposite to the turbine wheel.

One advantage of the foregoing is a reduction in the response time necessary in operation for bringing the coupling element into close engagement against the casing wall opposite to the turbine wheel.

In summary, due to the various features of its clutch plate, the lock up clutch according to the invention is well adapted to respond in a particularly simple and reliable manner to the various operating conditions to which it is subjected.

The features and advantages of the invention will appear more clearly from the description which follows, given by way of example and with reference to the accompanying diagrammatic drawings.

BRIEF DESCRIPTION OF THE DRAWINGS

FIG. 2 shows on a larger scale the detail indicated in FIG. 1 within the phantom line II.

FIG. 3 is also on a larger scale and shows a partial plan view of the lock up clutch according to the invention, seen in the direction of the arrow III in FIG. 1.

FIG. 4 is drawn to the same scale as FIG. 1, and is a partial view in elevation, showing the clutch plate of the lock up clutch, as seen in the direction of the arrow IV in FIG. 1.

FIGS. 5, 6, 7, 8 and 9 are partial views in axial cross-section, similar to FIG. 2 but showing respective alternative embodiments.

FIG. 10 is a partial plan view, similar to the view in FIG. 3 but showing a further embodiment.

FIG. 11 is a partial view in axial cross-section of the same embodiment, taken on the line XI—XI in FIG. 10.

DESCRIPTION OF A PREFERRED EMBODIMENT

Figure 1:
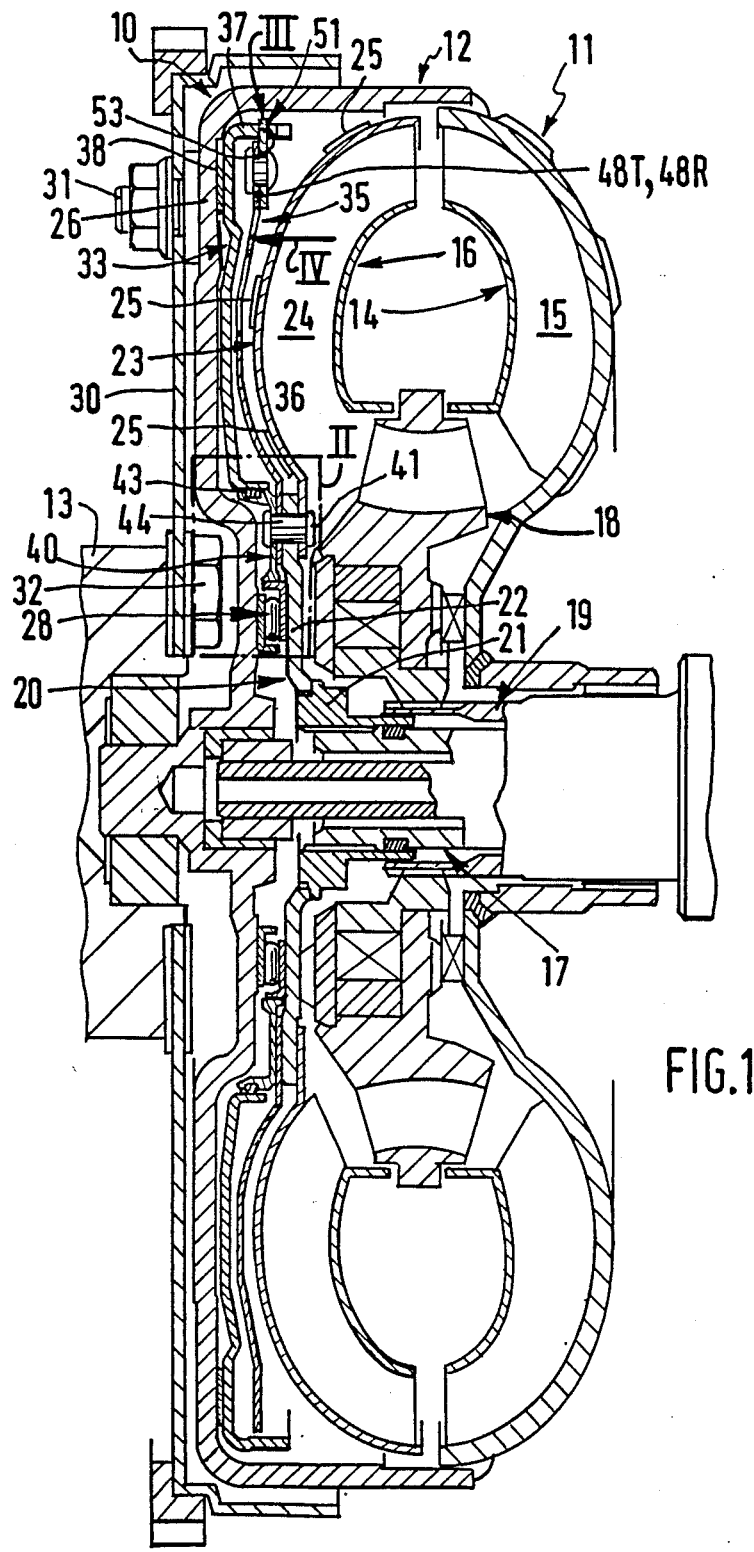
FIG. 1 is a view in axial cross-section of a lock up clutch according to the invention, this being shown in bolder lines in conjunction with a hydro kinetic coupling device, typical of the type of equipment with which it is intended to be used and shown in less bold lines.

The lock up clutch 10 according to the invention is intended to be used with the hydro-kinetic coupling device 11 shown in the less bold lines in FIG. 1.

This apparatus, which in this example is intended for use in an automotive vehicle, is a torque converter having a casing 12 which is arranged to be coupled with a first shaft for rotation therewith, this first shaft being for example the output shaft 13 or crankshaft of the engine of the automobile concerned. The torque converter also has an impulse wheel 14 which is coupled to the casing 12 for rotation therewith, the blades 15 of the impulse wheel being directly carried by the casing 12; and a turbine wheel 16, which is coupled with a second shaft 17 for rotation therewith. The second shaft 17 consists for example of the input shaft of the gearbox of the vehicle. Finally, the torque converter comprises a reaction wheel 18 which is carried by the fixed sleeve 19 that surrounds the driven shaft 17 in the conventional way.

The hub 20 of the turbine wheel 16 includes, in its central zone, a bush 21 through which it is connected with the driven shaft 17 for rotation therewith for example by a splined connection. At its periphery the hub 20 carries an annular plate 22. A body 23, which is generally toroidal in shape and carries the corresponding blades 24, is fixed to the annular plate 22 for example by welding as in FIG. 2 or with the aid of rivets 41 as is shown in FIGS. 5 to 9.

The blades 24 are fastened to the body 23 by means of pads/tabs 25 which extend axially of the body 23 and project from its outer convex surface. The pads 25 are formed in the body 23 by pressing or deformation and provide a suitable location means for the blades 24.

Three pads 25 are provided along a demi-meridian of the body 23. One of these is in the region of its outer periphery, i.e. that of greatest diameter, and the second pad is in the region of the inner periphery of smallest diameter. The third pad 25 is in an intermediate zone between the other two pads.

Having regard to the axial forces to which the turbine wheel 16 may be subjected in use, an axial thrust bearing 28 is provided, between the turbine wheel and the transverse wall 26 of the casing 12 which is opposite to the turbine wheel. The axial thrust bearing 28 is a needle bearing in this example.

The casing 12 is fixed to the driving shaft 13 for rotation with it by means of a plate 30, which is fixed at its outer periphery to the casing wall 26 by means of screws 31. At its inner periphery, the plate 30 is fixed by means of screws 32 to the driving shaft 13.

The lock up clutch 10 is interposed between the turbine wheel 16 and the casing wall 26.

The clutch 10 generally comprises a coupling element 33 which acts as a piston, together with a clutch or hub plate 35. The plate 35 is fixed to the element 33 for rotation with it, so as to allow the latter to be driven, and is attached to the coupling element solely by means of axially resiliently deformable tongues. The plate 35 is itself adapted to be coupled to any driving member whatsoever for rotation together with it such driving member being itself coupled for rotation with the turbine wheel 16.

In this example, the coupling element 33, which is in the general shape of a flat annular disc or wheel has, directed away from the casing wall 26, a first axial flange 36 on its inner periphery and a second axial flange 37 on its outer periphery.

On its back side, the element 33 has in the region of its outer periphery a friction lining 38, extending axially for close contact with the casing wall 26 so as to provide friction coupling with the latter.

The element 33 is slidingly engaged through its axial flange 36 with an annular member 40, which is coupled with the plate 22 (being for example carried on the latter) by means of rivets 41 which secure the element 33 to the supporting face plate portion 22 of the turbine casing body 23 which it carries. The annular member 40 thus serves as a means for the centering and guiding of the coupling element 33 at its inner periphery, by providing for the latter a hub which carries a sealing joint 43. At its inner periphery, the member 40 also acts as a means for centering a third member, which in this example is the axial thrust member 28.

The member 40 has holes 44 distributed circumferentially around it for accommodating the rivets 41.

In FIGS. 1 to 8, the member 40 is directly backed on to the plate 35, and the latter is trapped by means of its inner periphery between the member 40 and the plate 22.

The plate 35 has, arranged circumferentially around it, openings 45 through which fixing means may be mounted, such as the rivets 41 for securing it to the plate 22.

It is at its outer periphery that the plate 35 is fastened to the axial flange 37 for rotatably driving the coupling element 33.

So that the driving of the coupling element 33 in rotation is positive, the plate 35 has, in combination, two groups of strip portions 48T, 48R. These comprise a first group T, the strip portions 48T of which extend circumferentially in one direction which can be taken to correspond to operation of the assembly in the "driving" mode, and a second group R, the strip portions 48R of which extend circumferentially in the opposite direction which corresponds to operation of the assembly in the "reverse" mode.

In each of the groups of strip portions T and R of the plate 35, each tongue 48T is paired with a strip portion 48R, with a portion 48T of the first group T being continuous with a portion 48R of the second group R. The portions 48BT and 48R form a loop Which is separated from the running portion of the plate 35 by a series of slots 50, elongated circumferentially.

Thus, spaced apart circumferentially at regular intervals at the outer periphery of the plate 35, and immediately bounding the latter, there are five pairs of these strip portions 48T, 48R, arranged continuously end to end in the central zone of the loop 49 which they constitute.

When the plate 35 is designed to be sufficiently flexible axially, the strip portions 48T and 48R can be constituted directly by the periphery of the plate without it then being necessary to provide any slots.

Tenons 51 are provided on the plate 35 for securing it to the coupling element 33, and it is these tenons 51 which then define the strip portions 48T, 48R, with the strip portions extending to either side of the tenons.

In the embodiments shown, there is only one, common, tenon 51 for the two strip portions 48T and 48R of a single pair, with this tenon 51 extending substantially radially from the central zone of the loop 49.

The tenons 51 are separate members of the plate 35 and are generally of quadrilateral shape, each tenon being individually attached, by means of rivets 52, to the face of the loop 49 opposite to the coupling element 33.

When the plate 35 is made of spring steel sheet of relatively low thickness, of the order for example of 0.5 to 0.7 mm. and therefore very flexible, the tenons 51, like the coupling element 33, are in practice made of much thicker, and therefore more rigid, sheet material.

So as to be in engagement with the axial flange 37, which extends radially from the loops 49, the tenons 51 project radially from the plate 35. Each tenon 51 individually engages a respective slot 53. The latter serve as mortices, and are provided for this purpose in the axial flange 37. The edges of the slots 53 are deformed and engage over the tenons so as to retain them axially, and therefore retain the plate 35 axially with respect to the coupling element 33.

The plate 35 is generally shaped in the form of a torus, with its demi-meridian being generally curved between its outer periphery and its inner periphery, being concave away from the element 33, so as the better to follow the external surface of the body 23 but at a distance from the latter.

The plate 35 is provided with a number of oil passages or ports. Firstly, regularly spaced circumferentially around a first pitch circle in the region of the slots 50 and extending radially inwards with respect to the latter, there is a comparatively large number of generally rectangular oil ports 55. In addition, regularly spaced around a second pitch circle, at a smaller radius than the pitch circle of the ports 55, there is a smaller number, for example three, of generally circular oil ports 56. Each of the ports 55 lies facing a respective one of the pads 25 projecting from the convex outer surface of the body 23 in the intermediate zone of its demi-meridian.

Although the pads 25 project from the zone of the body 23 that is the most axially extended in the direction of the casing wall 26, they may also, during axial displacement of the lock up clutch 10, each engage in the ports 55 of the plate 35, with the resulting advantage that the axial bulk of the assembly is reduced.

Because of its curved shape, the plate 35 permanently urges the coupling element 33, with which it is associated, towards the casing wall 26. This takes place under the control of the oil which is present under pressure in the casing 12, whereby in operation the coupling element 33 impinges forcibly against the casing wall 28 or moves away from it.

The only object of the resilient application of forces to the coupling element 33 by the clutch plate 35 is to reduce the response time when it is being urged towards, and into coupling engagement with, the casing wall 26.

As will be understood, the ports 55 and 56 allow free circulation of oil in either direction, which also minimizes the corresponding response times.

In the embodiments shown in FIGS. 5 and 6, advantage is taken of the fact that the annular member 40 is directly backed on to the clutch plate 35, so as to provide, between the plate 35 and the member 40, annular indexing means which facilitate the engagement of the rivets 41 in the member 40. These means include at least one tab 57, integral with the plate 35 and projecting from its inner periphery in a generally axial direction. The tab 57 is engaged in an opening 58 which is provided for this purpose in the member 40. In this example this opening 58 is in the form of a slot extending substantially axially through the annular member 40 at its inner periphery.

Similarly, as shown in FIGS. 5 and 6, the annular member 40, which is retained radially with respect to the coupling element 33 because the latter is slidingly engaged on its outer periphery, is also retained axially with respect to the coupling element 33. In FIG. 5, its axial retention with respect to the element 33 is a result of the fact that it has, at its outer periphery, a radial extension 68 which is circumferentially continuous and by which the element 33 is inserted axially between the corresponding portion of the axial flange 36 and the plate 35. This radial extension 16 also provides an axial abutment for the coupling element 33 during declutching, in place of the plate 35.

In a modification as shown in FIG. 6, this axial retention results from the tab or tabs 57 of the plate 35 being axially in engagement with the member 40. Such a tab 57 may, for example, be bent up, radially outwardly, at its free end, so as to cooperate with a chamfer 59 provided for this purpose at the corresponding end of the opening 58 in which it is held. Due to the fact that the member 40 is thus retained in the radial as well as the axial direction with respect to the coupling element 33, the element 33, the plate 35 and the member 40 thus together constitute a unitary assembly.

In FIGS. 7 and 8, with a view to more effective sealing, projections extending annularly about the axis of the assembly are provided, radially on either side of the rivets 41, between the plate 35 on the one hand and, on the other hand, the annular member 40 and the annular plate 22 between which the plate 35 is interposed.

In FIG. 7, the projections comprise projections 60 provided on the annular plate 22, together with corresponding projections 61 provided on the annular member 40.

FIG. 8 shows a modified arrangement in which the projections consist of corrugations 60' and 61 which are formed alternately in the plate 35 (considered radially).

In the modification shown in FIG. 9, an annular member 40' and a separate annular member 40" are provided. The member 40' ensures the centering and sliding action of the coupling element 33 and carries the corresponding sealing joint. The member 40' is integral with the plate 22 and is shaped accordingly. The member 40" serves to center the axial bearing 28 and is made of thin sheet material. In such a case, the plate 35 is correspondingly held between the plate 22 and the body 23, holes 44 through which the rivets 41 extend are formed in the annular member 40". corresponding with the holes 45 in the plate 35.

In the modification shown in FIGS. 10 and 11, each of the tenons 51 is an integral part of the corresponding loop 49 of the plate 35. In order to increase the effective thickness of the tenon 51, it has at each of its circumferential ends an axially directed bent portion 63 which cooperates with the corresponding mortice of the axial flange 37.

In a lock up clutch according to the invention, the plate may of course be coupled with the coupling element for rotation with it, instead of by means of tenons and mortices, by any other means, and particularly by the use of teeth or dogs. However, because these tenons are easy to secure, coupling by means of tenon and mortice does have the advantage of also ensuring that the plate is axially urged on to the coupling element, so that the assembly of the lock up clutch is positively held together.

What is claimed is:

1. A lock up clutch for a hydro-kinetic coupling device, particularly for an automotive vehicle, said clutch being of the kind comprising a coupling element adapted to act as a piston, and a clutch or hub plate coupled with said coupling element for rotation therewith so as to permit the clutch plate and coupling element to be driven together in rotation, said clutch plate having strip portions integral therewith and axially deformable for rigid engagement of the clutch plate with said coupling element, the clutch plate being itself adapted to be coupled to a drive member for rotation therewith, the clutch being characterized in that the clutch plate has, in combination, two groups of said strip portions, namely a first group in which the strip portions extend circumferentially in one direction and a second group in which the strip portions extend circumferentially in the opposite direction, whereby the coupling element can be driven positively in rotation, tenons being provided on the clutch plate for coupling pairs of said strip portions with the coupling element, there being only one said tenon for the two strip portions of any one pair thereof, the coupling element having an axial edge portion at its outer periphery, said axial edge portion being provided with slots, and each said tenon extending substantially radially from the clutch plate and being engaged in a corresponding said slot with the slot constituting a mortice.

2. A lock up clutch according to claim 1, characterized in that each said strip portion of one said group thereof is associated as a said pair with a said strip portion of the other group, a said strip portion of the first group being continuous with a strip portion of the second group, in the manner of a loop, the assembly being separated from a running part of the clutch plate by a slot engaged circumferentially.

3. A lock up clutch according to claim 2, characterized by oil ports formed in the clutch plate, the clutch being arranged close to a turbine wheel having blades fastened to a body which carries them by means of pads which extend axially outwardly from said body, whereby said oil ports are in register with said pads, the pads being formed in said body by pressing or deformation.

4. A lock up clutch for a hydro-kinetic coupling device, particularly for an automotive vehicle, said clutch being of the kind comprising a coupling element adapted to act as a piston, and a clutch or hub plate coupled with said coupling element for rotation therewith so as to permit the clutch plate and coupling element to be driven together in rotation, said clutch plate having strip portions integral therewith and axially deformable for rigid engagement of the clutch plate with said coupling element, the clutch plate being itself adapted to be coupled to a drive member for rotation therewith, the clutch being characterized in that the clutch plate has, in combination, two groups of said strip portions, namely a first group in which the strip portions extend circumferentially in one direction and a second group in which the strip portions extend circumferentially in the opposite direction, whereby the coupling element can be driven positively in rotation, the clutch plate being secured to an axial flange formed for that purpose on the coupling element at the outer periphery of the clutch plate, the demi meridian of the clutch plate being generally curved and being concave in a direction away from said coupling element.

5. A lock up clutch for a hydro-kinetic coupling device, particularly for an automotive vehicle, said clutch being of the kind comprising a coupling element adapted to act as a piston, and a clutch or hub plate coupled with said coupling element for rotation therewith so as to permit the clutch plate and coupling element to be driven together in rotation, said clutch plate having strip portions integral therewith and axially deformable for rigid engagement of the clutch plate with said coupling element, the clutch plate being itself adapted to be coupled to a drive member for rotation therewith, the clutch being characterized in that the clutch plate has, in combination, two groups of said strip portions, namely a first group in which the strip portions extend circumferentially in one direction and a second group in which the strip portions extend circumferentially in the opposite direction, whereby the coupling element can be driven positively in rotation, an annular member for centering a third member by means of an inner periphery of the annular member, said annular member having first holes arranged circumferentially therein for the purpose of coupling the annular member with the associated drive member for rotation therewith, each said first hole corresponding with a respective one of a plurality of second holes, arranged circumferentially in the clutch plate, with fixing means common to said clutch plate and said annular member extending through said first holes and said second holes.

6. A lock up clutch according to claim 5, characterized in that said annular member is also arranged at its outer periphery for the centering and sealed sliding movement of the coupling element, the annular member being, further, directly backed on to the clutch plate, the clutch further comprising indexing means between the clutch plate and said annular member.

7. A lock up clutch according to claim 5, characterized in that said annular member is also adapted at its outer periphery for the centering and sealed sliding moveemnt of the coupling element, the clutch further comprising means retaining said annular ember radially with respect to the coupling element whereby the annular member is retained both radially and axially with respect to the coupling element, so that the coupling element, the clutch plate and the annular member together constitute a unitary assembly.

* * * * *